US009071726B2

(12) United States Patent
Mclaughlin et al.

(10) Patent No.: US 9,071,726 B2
(45) Date of Patent: Jun. 30, 2015

(54) VIDEOCAST SERVICE ARCHITECTURE

(71) Applicant: Cellco Partnership, Arlington, VA (US)

(72) Inventors: Ann V. Mclaughlin, Waltham, MA (US); Theodore C. Vitolo, Jr., Basking Ridge, NJ (US); William Andrew Fish, Bridgewater, NJ (US); Thomas Michael Carr, Scituate, MA (US)

(73) Assignee: Cellco Partnership, Basking Ridge, NJ (US)

( * ) Notice: Subject to any disclaimer, the term of this patent is extended or adjusted under 35 U.S.C. 154(b) by 89 days.

(21) Appl. No.: 13/930,233

(22) Filed: Jun. 28, 2013

(65) Prior Publication Data

US 2015/0002608 A1 Jan. 1, 2015

(51) Int. Cl.
*H04N 7/14* (2006.01)
*H04N 7/18* (2006.01)
*H04N 21/2187* (2011.01)

(52) U.S. Cl.
CPC ............... *H04N 7/147* (2013.01); *H04N 7/181* (2013.01); *H04N 21/2187* (2013.01)

(58) Field of Classification Search
CPC ........................................................ H04N 7/147
USPC ............. 370/254, 343, 352; 709/204; 725/25, 725/61, 80, 87, 95, 114, 115, 39, 109; 348/14.03, 469; 455/450; 705/35; 715/758
See application file for complete search history.

(56) References Cited

U.S. PATENT DOCUMENTS

| | | | | |
|---|---|---|---|---|
| 5,926,476 | A * | 7/1999 | Ghaibeh | 370/395.65 |
| 5,956,338 | A * | 9/1999 | Ghaibeh | 370/236.2 |
| 7,624,417 | B2 * | 11/2009 | Dua | 725/114 |
| 8,155,098 | B2 * | 4/2012 | Huang et al. | 370/343 |
| 8,160,598 | B2 * | 4/2012 | Savoor | 455/450 |
| 8,209,729 | B2 * | 6/2012 | Phillips et al. | 725/87 |
| 8,522,276 | B2 * | 8/2013 | Angiolillo et al. | 725/39 |
| 8,584,174 | B1 * | 11/2013 | Fyock et al. | 725/61 |
| 8,635,658 | B2 * | 1/2014 | Patten et al. | 725/115 |
| 8,707,189 | B2 * | 4/2014 | Liu et al. | 715/758 |
| 8,713,615 | B2 * | 4/2014 | Angiolillo et al. | 725/80 |
| 8,738,693 | B2 * | 5/2014 | Julia et al. | 709/204 |
| 8,756,624 | B2 * | 6/2014 | Blommaert et al. | 725/25 |
| 2003/0051251 | A1 * | 3/2003 | Sugimoto et al. | 725/95 |
| 2006/0085826 | A1 * | 4/2006 | Funk et al. | 725/87 |
| 2006/0088028 | A1 * | 4/2006 | Leiber et al. | 370/352 |
| 2008/0046349 | A1 * | 2/2008 | Elberg et al. | 705/35 |
| 2010/0118190 | A1 * | 5/2010 | Salfati et al. | 348/469 |
| 2010/0154012 | A1 * | 6/2010 | Clavenna et al. | 725/109 |
| 2010/0246436 | A1 * | 9/2010 | Yang et al. | 370/254 |
| 2015/0002608 | A1 * | 1/2015 | Mclaughlin et al. | 348/14.03 |

* cited by examiner

*Primary Examiner* — Gerald Gauthier

(57) ABSTRACT

A videocast service may include at least one computing device configured to provide operations including: receiving an indication, from a videocast subscriber device connected to a communications network of network service provider, to begin providing a videocast from the videocast subscriber device according to selection of a videocast control from a user interface of the videocast subscriber device; validating the subscriber device as having opted into use of the videocast service by way of the network service provider; and if the subscriber device is opted in, initiating the videocast without requiring further user interface interaction from the videocast subscriber device.

20 Claims, 5 Drawing Sheets

VIDEOCAST SERVICE ARCHITECTURE

BACKGROUND

The advent of mobile communications devices with video capture and networking features has allowed for the introduction of advanced sharing features. For example, video broadcast (or videocast) functionality may now be possible to allow users of mobile communications devices to capture and share video content online. However, such functionality may require complicated user interfaces that vary according to context, therefore making the videocast functionality cumbersome to use.

DETAILED DESCRIPTION

Figure 1:
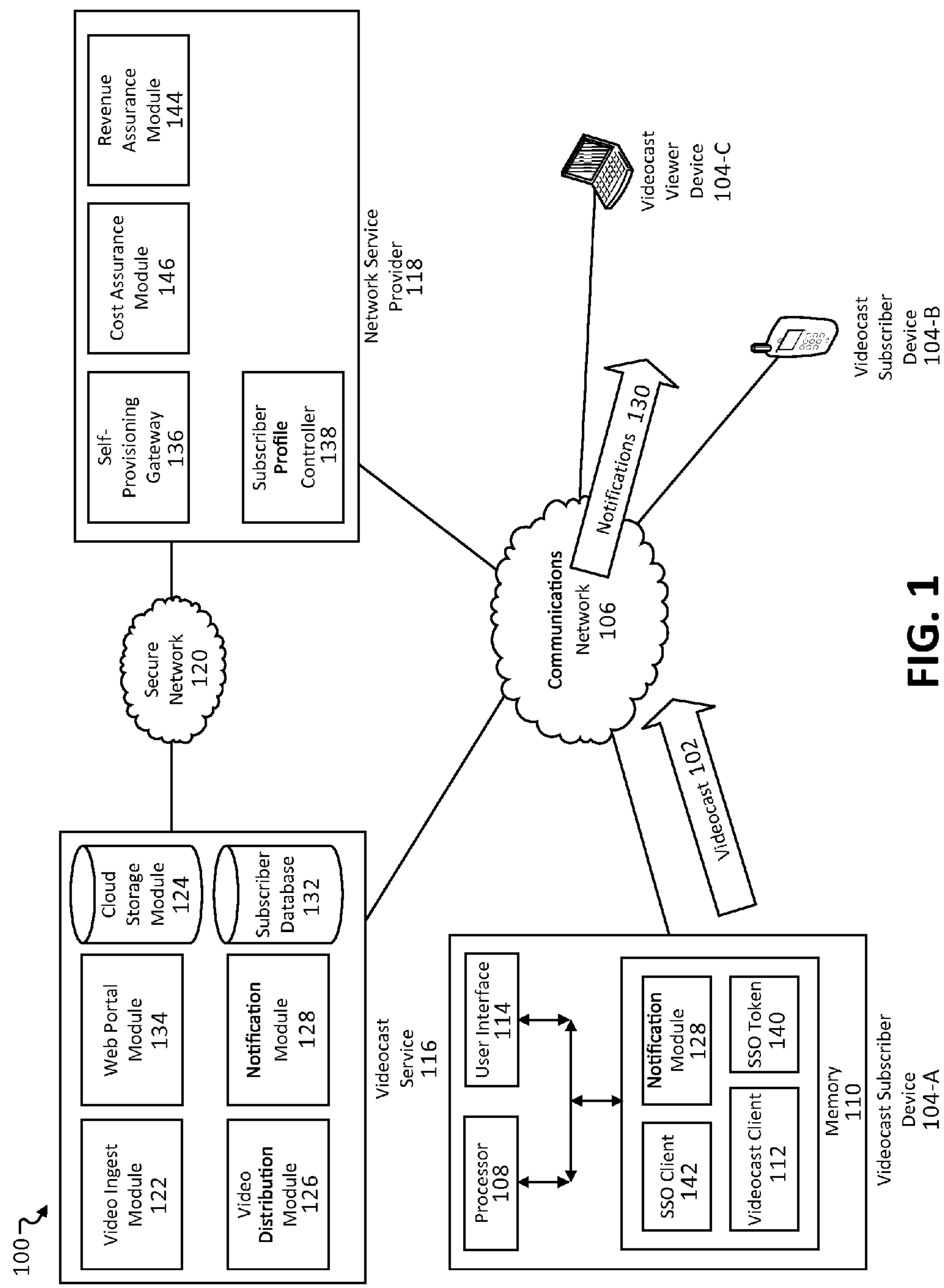
FIG. 1 illustrates an exemplary system architecture for supporting videocasts.

A unified public and personal videocast system may allow a subscriber to launch a live videocast from his or her subscriber device. The videocast functionality may be supported by a videocast client application executed by the subscriber device configured to capture video, in cooperation with a videocast service configured to provide the videocast to one or more recipients over a communications network of a network service provider.

The videocast client application may be configured to provide a user interface having an option to trigger a live videocast directly from a camera application, such as by way of a "go live" button of the camera application, in addition to the typical capture picture and capture video functions. In some cases, the subscriber user interface may be integrated with an embedded camera application, thereby provide easy intuitive access right from the camera interface, while in other cases, the subscriber user interface may be provided by a downloadable videocast client supporting an interface to the native camera or its own camera implementation on the device.

The videocast client application may support various mechanisms to target recipients of the videocast. As one option, the subscriber may by presented with options to select individuals from their contacts to trigger notifications (e.g., via short message service (SMS), e-mail, instant message, etc.) inviting the users to join the personal videocast. As another example, a notification of the videocast may be posted to a social network account (e.g., via Twitter or Facebook). As yet a further example, a videocast may be indexed or otherwise made available for public search and consumption. In some cases, public videocast notifications may be sent to recipients that have previously opted into the subscriber's public videocasts. The selection of targeted recipients may be performed as part of initiating the videocast, or prior to initiating the videocast and stored as user settings. Regardless of the videocast recipients, the videocast application may be configured to provide the subscriber with a common user interface, thereby providing the same application user experience for the videocast originator, whether the videocast is intended for the general public or for specific target recipients.

The videocast client application and videocast service may be further configured to take advantage of existing network service provider infrastructure to manage videocast subscriber account permissions and opt-in approval. For example, the videocast service may utilize subscriber profile controller and self-provisioning gateway functionality of the network service provider to automatically authenticate and authorize the videocast client application, based on a subscriber token resident on the videocast subscriber device, and the connection of the videocast subscriber device to the communications network. By use of these network service provider features, the videocast client application may be able to provide the "go-live" videocast control to the subscriber without additional authentication input, thereby allowing the user to quickly launch a videocast with a single user interface command.

FIG. 1 illustrates an exemplary system 100 architecture for supporting videocasts 102. The system 100 may include one or more videocast subscriber devices 104 in communication over a communications network 106 and capable of sending or receiving videocasts 102. The videocast subscriber devices 104 may include processors 108 that execute instructions stored on memories 110, such as those of a videocast client 112 providing a videocast user interface 114. The system 100 may further include a videocast service 116 configured to provide the network videocast 102 functionality and a network service provider 118 in communication with the videocast service 116 over a secure network 120 (or in other examples over communications network 106) configured to handle subscription and provisioning with respect to users of the videocast subscriber devices 104. The videocast service 116 may be implemented as one or more computing devices having processors 108 and memories 110, and may include a video ingest module 122, a cloud storage module 124, a video distribution module 126, a notification module 128 providing notifications 130, a subscriber database 132 and a web portal module 134 to support the videocast 102 functionality. The network service provider 118 may also be include a self-provisioning gateway (SPG) 136, a subscriber profiler controller (SPC) 138, a revenue assurance module 144, and a cost assurance module 146 to facilitate subscription integration and revenue and payment reconciliation with the videocast service 116. The videocast subscriber device 104 may also store a single-sign-on (SSO) token 140 and a SSO client 142 in its memory 110 to use to identify the device 104 to the network and to facilitate seamless authentication to the videocast service 116. In some examples, the videocast subscriber devices 104 may also include a notification module 128 to provide certain notifications 130. The system 100 may take many different forms and includes multiple and/or alternate components and facilities. While an exemplary system 100 is shown in FIG. 1, the exemplary components illustrated of the system 100 are not intended to be limiting. Indeed, additional or alternative components and/or implementations may be used.

A videocast 102 may include a video signal encoded for transmission across the communications network 106. The videocast 102 may further optionally include additional content, such as encoded audio or textual data. In some cases, videocasts 102 may include content that is being captured and is substantially live, while in other cases videocasts 102 may include pre-recorded or otherwise stored content that is not substantially live.

The videocast subscriber devices 104-A, 104-B and 104-C (collectively 104) may be devices configured to be used by a subscriber one or more of send and receive videocasts 102 over a communications network 106. In some examples, a videocast subscriber device 104 may lack display hardware suitable for reception of a videocast 102, but may be able to provide a videocast 102.

The videocast subscriber devices 104 may be implemented as a combination of hardware, software and firmware, and may include one or more software applications or processes stored on non-transitory memories 110 for causing one or more computer processors 108 to perform the operations of the videocast subscriber devices 104 described herein. One such application may be a videocast client 112, while in other examples, some or all of the videocast functionality discussed herein may be implemented by other components, such as in whole or in part by embedded software or other camera software installed on a memory 110 of the device 104. Exemplary videocast subscriber devices 104 may include any of various models of video-capable networked device, such as voice over internet protocol (VoIP) phones, mobile telephones, "softphone" software applications, media content processing systems such as cable set top boxes, computers such as laptops, desktops, and tablet devices, or other types of portable computing devices capable of executing applications and communicating videocast over the communications network 106 such as video cameras.

Some videocast subscriber devices 104 may lack the ability to provide videocasts 102, but may be capable of receiving videocasts 102. Such videocast subscriber devices 104 may be referred to herein as videocast viewer devices 104-C in some cases to stress the viewing functionality, or in other cases simply as videocast subscriber devices 104 generally. For example, a desktop computer lacking a video camera but including a video player and a browser tool may be able to access and receive videocasts 102 but not provide or create its own videocasts 102.

The communications network 106 may provide communications services, including packet-switched network services (e.g., Internet access, VoIP communication services) to devices such as videocast subscriber devices 104. Exemplary communications networks 106 may include the PSTN, a VoIP network, a cellular telephone network, a fiber optic network, and a cable television network. To facilitate communications, each videocast subscriber on the communications network 106 may have his or her own unique identifier used to indicate, reference, or selectively connect the subscriber's device 104 to the communications network 106. Exemplary device identifiers may include telephone numbers, mobile device numbers (MDNs), common language location identifier (CLLI) codes, Internet protocol (IP) addresses, input strings, and universal resource identifiers (URIs), as some possibilities.

The videocast subscriber devices 104 may include user interface 114 hardware capable of receiving input from a user and/or providing output to the user. The user interface 114 hardware components may allow for the operation and control of the functions of the videocast subscriber devices 104. The user interface 114 hardware may further provide feedback and other output to the user to aid the user in making operational decisions with respect to the videocast subscriber devices 104. Exemplary user interface 114 hardware may include still cameras, video cameras or other video capturing devices capable of capturing video content (e.g., for inclusion in a videocast 102), as well as microphones or other sound capturing devices capable of capturing audio content. The user interface 114 hardware may further include keyboards, buttons, display screens, touch screens, haptic feedback transducers and loudspeakers or other sound producing elements to facilitate use of the devices 104.

In some cases the user interface 114 may be visual, and may be provided visually such as on a screen. In other cases the user interface 114 may be audio-based, and may be provided audibly such as by sound production elements of or attachments to the device 104. The user interface 114 hardware may also be used to receive input from the user interface 114. In some cases, the user interface 114 may receive physical input, such as by way of keyboards, buttons, or touch screens. In other cases, the user interface 114 may receive audio and/or video input, such as from the microphone or camera device components.

The videocast service 116 may be implemented as one or more computing devices, where the computing devices may include software stored in memories 110 that may be executed by processors 108 to provide the operations of the videocast service 116 described herein. Alternatively the videocast service 116 and its components may be provided as hardware or firmware, or combinations of software, hardware and/or firmware. Although one example of the modularization of the videocast service 116 is illustrated and described, it should be understood that the operations thereof may be provided by fewer, greater, or differently named modules.

The videocast service 116 may be configured to maintain videocast 102 stream data as well as perform other functions in the support of videocast functionality of the videocast subscriber devices 104. As some examples, the videocast service 116 may include a video ingest module 122 configured to support the receipt of videocasts 102 from videocast subscriber devices 104 or other sources, a cloud storage module 124 configured to buffer or maintain received videocasts 102 for storage and administration from the videocast subscriber devices 104, and a video distribution module 126 configured to deliver videocasts 102 to the videocast subscriber devices 104 and/or videocast viewer devices 104-C.

The videocast service 116 may further include a notification module 128 configured to provide notifications 130 to videocast subscriber devices 104 and/or videocast viewer devices 104-C of videocasts 102 that may be available. For example, a videocast subscriber device 104 may be configured to be notified of new or starting videocasts 102 from a particular videocast subscriber device 104. In some cases, the videocast subscriber devices 104 may additionally or alternately including a notification module 128 configured to allow the videocast subscriber devices 104 to provide notifications 130 to videocast subscriber devices 104 without requiring use of the videocast service 116. For instance, a notification module 128 of a videocast subscriber devices 104 may send notifications 130 from the videocast subscriber devices 104 to one or more target videocast subscriber devices 104 over SMS.

The videocast service 116 may also include a subscriber database 132 configured to store account details of the videocast subscribers 104, such as which videocasts 102 are owned by or associated with the subscriber, as well as configuration information such as which videocast subscriber devices 104 and/or videocast viewer devices 104-C are signed up to be notified of videocasts 102 from which other videocast subscriber devices 104. The videocast service 116 may also include a web portal module 134 configured to facilitate the web viewing of videocasts 102 as well as content management of the videocasts 102.

The network service provider 118 may be configured to handle subscription and provisioning with respect to users of the videocast subscriber devices 104. For example, the network service provider 118 may include an SPG 136, which may be one or more devices on the network that allow a user to enable and disable subscription services by way of the user's subscriber device 104. The SPG 136 accordingly provides network service provisioning functionality to the subscriber devices 104. By using an application on the subscriber device 104, a user may utilize the SPG 136 to sign up for additional network services. As one example, the SPG 136 may be utilized to provision videocast services for the videocast subscriber device 104 upon receiving a subscriber opt-in indication from the videocast subscriber device 104 (e.g., upon agreeing to terms of use of the videocast service 116 or upon agreeing to pay charges incurred for use of the videocast service 116, etc.).

The network service provider 118 may further include an SPC 138 configured to authenticate/authorize subscriber devices 104 for services of the network service provider 118, such as for services supported by the videocast service 116. As one example, the SPG 136 may utilize the SPC 138 to provide validation services to verify that the subscriber device 104 is associated with a subscriber able to utilize the videocast service 116. If so, the SPC 138 may be configured to validate that the videocast service 116 is authorized to request that the videocast service 116 be provisioned on behalf of the subscriber, e.g., by providing an SSO token 140 to the SPC 138 from a SSO client 142 of the videocast subscriber device 104.

The SSO token 140 may be a value stored on the videocast subscriber device 104 based on verification of the videocast subscriber device 104 with the network service provider 118. For instance, the network service provider 118 may issue a SSO token 140 to a videocast subscriber device 104 based on connection of the videocast subscriber device 104 to the communications network 106 (e.g., according to successful network authentication of the videocast subscriber device 104). The issued SSO token 140 may then be stored on the videocast subscriber device 104 for further use in authenticating the videocast subscriber device 104 with other services. The SSO client 142 may be configured to receive and selectively provide the SSO token 140 for validation of the subscriber with network services, one example of which may be the videocast service 116.

The network service provider 118 may further include other functionality. As one example, the network service provider 118 may include a revenue assurance module 144 configured to support the transfer of information related to network service provider 118 subscriber activity to validate and recognize associated data/advertising revenue. As another example, the network service provider 118 may include a cost assurance module 146 configured to support transfer of information related to network service provider 118 subscriber activity which supports validation and recognition of incoming payments from the videocast service 116 to settle associated advertising revenue share. The cost assurance module 146 may be responsible for payments owed to vendors and payments owed to the network service provider 118. For example, the network service provider 118 may accrue charges that are to be paid to the videocast service 116 based on a number of network service provider 118 subscribers who access the videocast service 116 or based on usage of the videocast service 116 by the subscribers of the network service provider 118.

Figure 2:
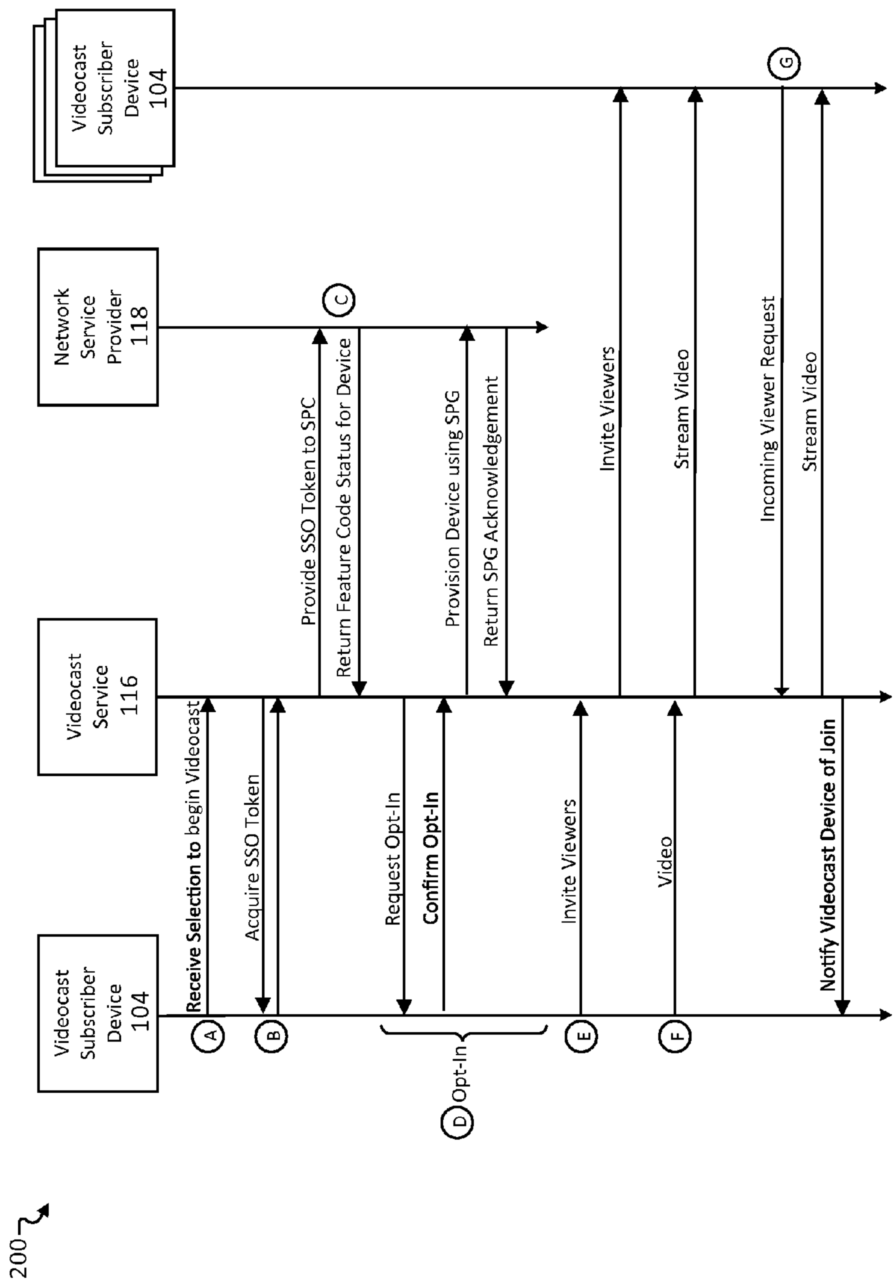
FIG. 2 illustrates an exemplary flow diagram of network interactions for the providing of a live broadcast videocast.

FIG. 2 illustrates an exemplary flow diagram 200 of network interactions for the providing of a live broadcast videocast 102 from the videocast subscriber device 104. Creation of the videocast 102 may be requested by a videocast client 112 executed by the videocast subscriber device 104. The request may cause a videocast service 116 to verify the videocast subscriber device 104 as being provisioned to support videocast 102 functionality, as well as to be opt-ed in to use of the videocast service 116. If so, the request may further cause the videocast service 116 to notify one or more other videocast subscriber devices 104 and/or videocast viewer devices 104-C of the availability of the videocast 102, and to provide the videocast 102 to those devices 104 that desire to view the videocast 102.

More specifically, with respect to the diagram 200 at index (A), the videocast service 116 may receive a selection from the videocast subscriber device 104 indicative of a user request to initiate a videocast 102 from the videocast subscriber device 104. For example, a subscriber may invoke a videocast 102 function using a control of a user interface 114 of the videocast client 112.

At index (B), responsive to the videocast 102 request, the videocast service 116 requests a single-sign on (SSO) token 140 from a single sign-on client 140 resident on the videocast subscriber device 104. The SSO token 140 may be requested by the videocast service 116 to verify whether the subscriber has been authorized to use the videocast service 116. This request for the SSO token 140 may be performed silently, such that no user interface 114 elements require interaction from the subscriber to facilitate the validation.

At index (C), the videocast service 116 may validate the subscriber of the videocast subscriber device 104 with the network service provider 118 using the SSO token 140. For example, the videocast service 116 may provide the SSO token 140 to the SPC 138 sent to obtain authorization parameter values associated with the subscriber. The videocast service 116 may further provide additional information along with the SSO token 140, such as a parameter value indicative of whether the subscriber has blocked or unblocked the videocast service through configuration settings of the subscriber with the network service provider 118. The SPC 138 may accordingly return a feature code status to the videocast service 116 indicative of whether the videocast service 116 is available for the videocast subscriber device 104. The videocast service 116 may determine, based on the returned feature code status whether the videocast subscriber device 104 has opted in to use of the videocast service 116. If so, the opt-in procedure may be omitted and the flow may continue to index (E). If not, the opt-in procedure may be performed and the flow may continue to index (D). Accordingly, the issued SSO token 140 stored on the videocast subscriber device 104 may be used by network services for authentication and authorization purposes, thereby taking advantage of the authentication of the videocast subscriber device 104 to the network service provider 118 for use in validating the subscriber of the videocast subscriber device 104 as able to use other network services.

At index (D), the videocast service 116 utilizes an interface of the SPG 136 of the network service provider 118 to enable the subscriber to opt-in to use of the videocast service 116. For example, if the SPC 138 indicates that the subscriber has been authorized to access the videocast feature, but has yet to opt in, the videocast service 116 may be configured to inform the videocast client 112 to offer the ability to opt-in the subscriber. If the subscriber confirms the opt-in, then the videocast subscriber device 104 informs the videocast service 116 of assent to use the videocast service 116. If so, the videocast service 116 may then provision the videocast subscriber device 104 to utilize the videocast service 116 by way of a provisioning interface of the SPG 136 of the network service provider 118. In some examples as part of the opt-in procedure, the videocast service 116 may allow the subscriber to correlate an existing videocast service 116 account that the subscriber may have with the subscriber's network service provider 118 device or account information. Correlation of the videocast service 116 account with the network service provider 118 account of the videocast subscriber device 104 may allow for a user of a videocast subscriber device 104 to automatically be logged into the videocast service 116 web portal module 134 without having to supply credentials when browsing to a videocast 102 or other link of the web portal module 134. If the subscriber declines to opt-in or if the videocast subscriber device 104 is not authorized to access the videocast feature, then the flow ends.

At index (E), the videocast service 116 may be configured to allow the videocast subscriber device 104 to invite viewers to view the videocast 102. For example, the videocast service 116 may be configured to receive indications of viewers for the videocast service 116 to notify of the videocast 102. The indications of viewers may include one or more of: selections of contacts from an address book of the videocast subscriber device 104, selections of users of a social network with which the subscriber of the videocast subscriber device 104 is associated, selections of users of the videocast service 116 itself. Or, for public videocasts 102, a subscriber may be browsing the content portal 400, may discover that the subscriber is videocasting, and may select to join the videocast 102. In some cases, the videocast service 116 may be configured to automatically notify users who have selected a preference to be notified of videocasts 102 of the subscriber. This preference to be notified of content of the subscriber (e.g., initiating of a live videocast 102, identification of new stored content or currently active videocasts 102, etc.) may be referred to as "following" the subscriber. Details of which videocast subscriber devices 104 are following what other subscribers may be stored in the subscriber database 132 for use when a new videocast 102 for a videocast subscriber device 104 becomes available. In some examples, a videocast 102 may simply be made public and available to be viewed by other users of the videocast service 116, without necessarily notifying any users of the videocast service 116.

The videocast service 116 may be configured to provide the notifications 130 to the users through various mechanisms. As an example, the videocast service 116 may notify the users by notifications 130 of various forms, such as by way of SMS text messaging, instant messaging protocols (e.g., AOL instant messenger protocol, Yahoo! instant messenger protocol, Microsoft instant messenger protocol, session initiation protocol for instant messaging and presence leveraging extensions (SIMPLE) protocol, etc.), e-mail messaging, or messaging through a social network or a post to the social network (e.g., in cases in which the users were selected from contacts of the subscriber in the social network). In other examples, notifications 103 may be provided by the videocast subscriber device 104 rather than from the videocast service 116 (e.g., by way of SMS functionality of the videocast subscriber device 104). The notifications 130 may include information that may be used by the invited users to view the videocast 102. As one example, the information may include a uniform resource locator (URL) referencing a location of a video distribution module 126 of the videocast service 116 at which the videocast 102 may be made available, an indication of a subscriber for whom new content may be available, or an indication of an identifier of the videocast 102 as some examples. One or more of the invited users may utilize the information to view the videocast 102. For instance, one or more of the invited users may navigate to a URL provided in the notification 130.

At index (F), the videocast service 116 may be configured to receive the videocast 102 from the videocast subscriber device 104. The videocast service 116 may accordingly store the videocast 102 in permanent storage stream the videocast 102 to the target videocast subscriber devices 104 that accepted the invitation to view the videocast 102, or both.

In some examples, it may be desirable to allow users to join a videocast 102 that is in progress. For example, as illustrated at index (G), the videocast service 116 may be configured to receive incoming viewer requests from videocast subscriber devices 104. Upon receipt of such a request, the videocast service 116 may likewise stream the videocast 102 to the requesting videocast subscriber device 104 and/or videocast viewer device 104-C. Additionally, the videocast service 116 may be further configured to notify the videocast subscriber device 104 from which the videocast 102 is provided of the additionally joined user or users.

Figure 3:
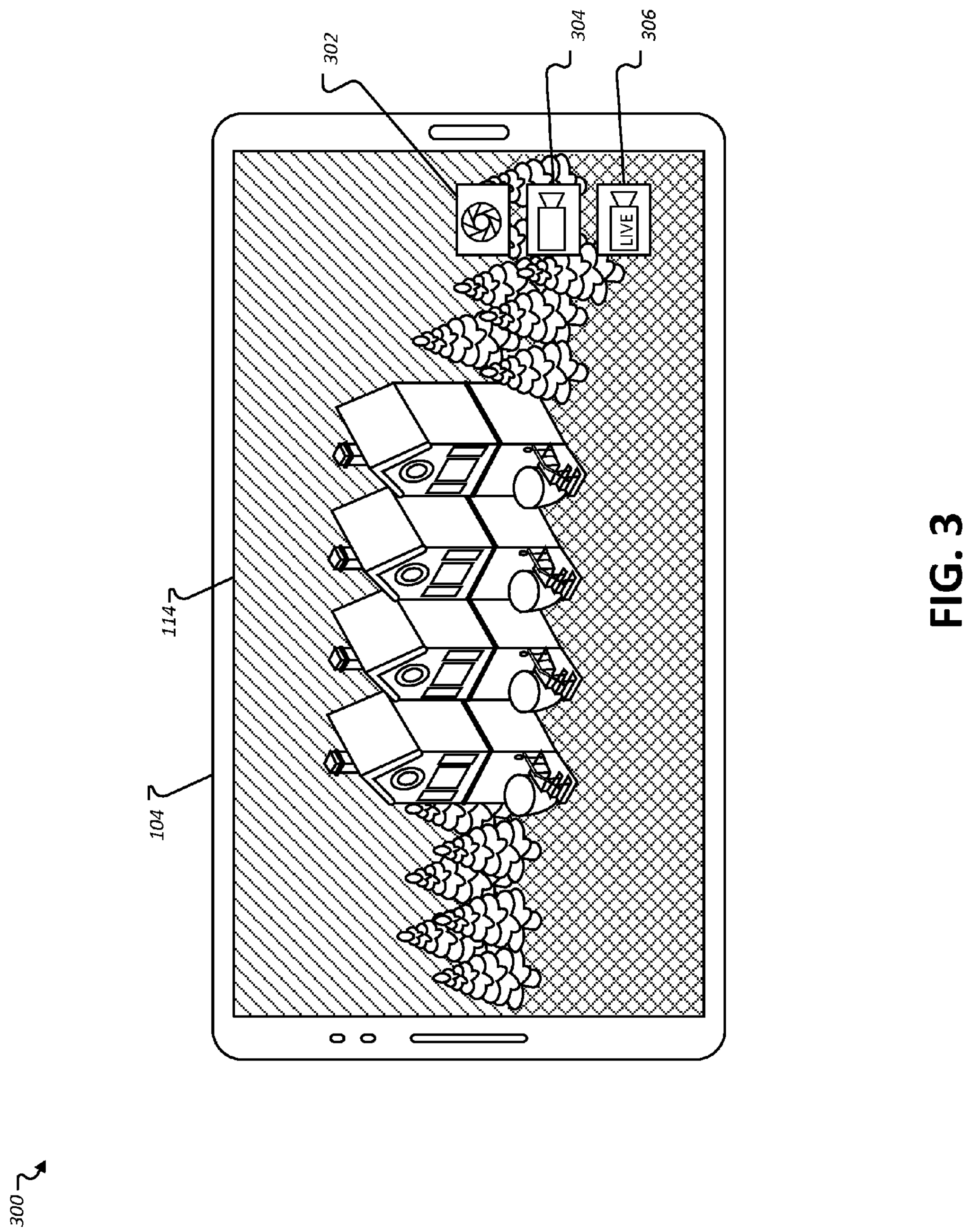
FIG. 3 illustrates an exemplary user interface of a camera screen of a videocast client configured to facilitate initiation of a videocast from a videocast subscriber device.

FIG. 3 illustrates an exemplary user interface 114 of a camera screen 300 of a videocast client 112 configured to facilitate initiation of a videocast 102 from a videocast subscriber device 104. The user interface 114 may be provided to a subscriber when the videocast client 112 is executed by one or more processors 108 of the videocast subscriber device 104 of the subscriber. In some cases, the videocast client 112 may be integrated into an embedded camera application of the videocast subscriber device 104, thereby provide easy intuitive access right from the camera interface. In other cases, the user interface 114 may be provided by a downloadable videocast client 112 separate from the camera application but supporting its own interface to the camera or camera application functionality itself.

The videocast client 112, the user interface 114 may include controls such as an image capture control 302 that when selected is configured to cause an image capture device of the videocast subscriber device 104 to capture a still image. The user interface 114 may also include a video capture control 304 that when selected is configured to cause a video capture device of the videocast subscriber device 104 to capture video. The user interface 114 may also include an additional videocast capture control 306 that when selected by the user is configured to cause the videocast client 112 to request initiation of a videocast 102 from the videocast subscriber device 104. This control may be referred to as a "go live" control. For example, selection of the videocast capture control 306 may cause the videocast subscriber device 104 to provide a message to a videocast service 116 indicative of a user request to initiate a videocast 102 from the videocast subscriber device 104.

Figure 4:
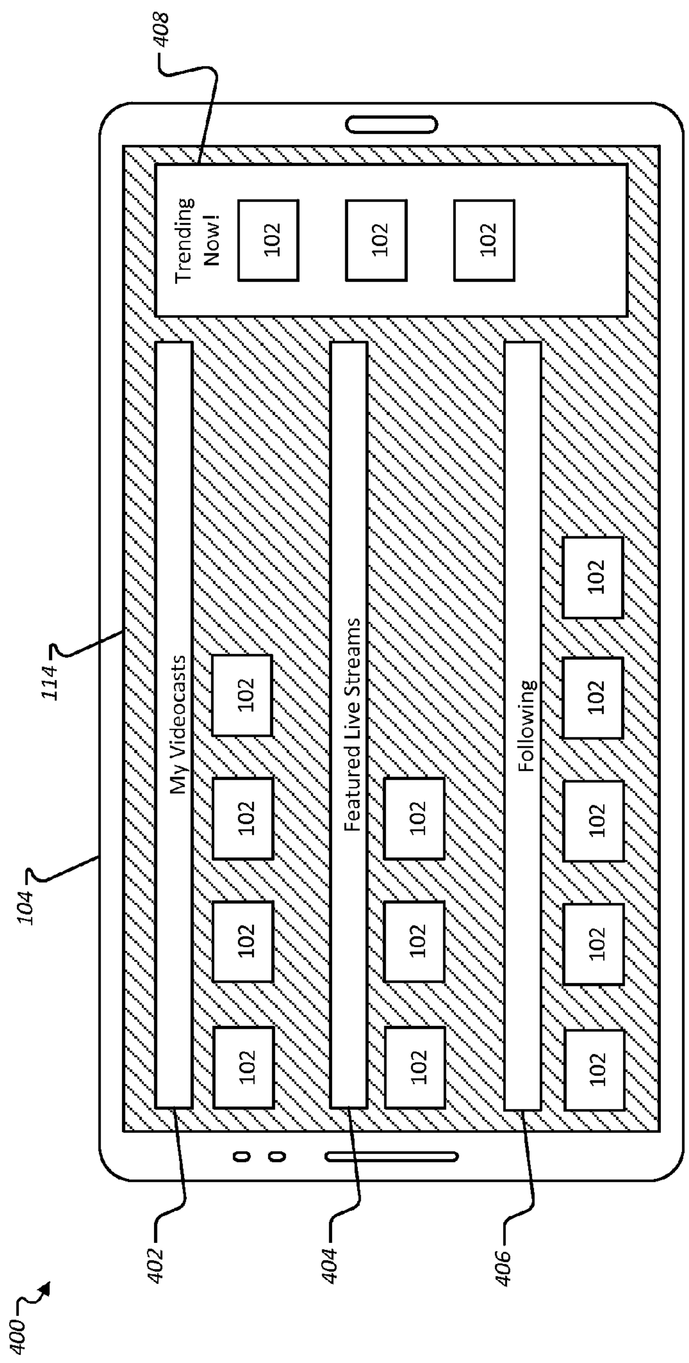
FIG. 4 illustrates an exemplary user interface of a videocast content portal of a videocast viewer device.

FIG. 4 illustrates an exemplary user interface 114 of a videocast 102 content portal 400 of a videocast subscriber device 104. Through the content portal 400, a subscriber to the videocast service 116 may be able to manage their previous videocasts 102.

The user interface 114 of the content portal 400 may include a "my" videocasts 402 listing of videocasts 102 of the subscriber. The user interface 114 may also include a listing of featured live streams 404 that may be selected by a subscriber to cause a videocast 102 of the corresponding live stream to be provided to the videocast subscriber device 104. The user interface 114 may also include a listing of videocasts 102 or other new contents provided by subscribers to which the subscriber of the videocast subscriber device 104 is following. In some cases, the user interface 114 may further include a listing of trending 408 videocasts 102, which may be those videocasts 102 that are currently popular or becoming popular. Selection of any of the aforementioned videocasts 102 may cause the videocast subscriber device 104 to provide an incoming viewer request to the videocast service 116 configured to request for the selected videocast 102 to be provided back to the videocast subscriber device 104.

In some examples the user interface 114 may be made available through the videocast client 112. In other examples, to access the user interface 114 the subscriber may use of a browser application feature of the videocast subscriber device 104 (e.g., a predefined URL bookmark supplied in the bookmarks of the browser application) to log into the videocast service 116 web portal module 134. The browser application may utilize the SSO token 140 to allow the subscriber to log in automatically, without having to supply credentials when browsing to a videocast 102 or other link of the web portal module 134. If subscribers elect to download a different browser or to use a different device to access the content portal 400 that does not support SSO token 140 authentication, then the subscriber may be required to provide credentials to the videocast service 116 to access their account since the subscriber may not be authenticated according to network service provider 118 account credentials.

The user interface 114 of the content portal 400 may further provide for additional content management features. As an example, the content portal 400 may allow for a user to perform various management operations on the "my" videocasts 102 associated with the logged-in subscriber. For instance, the subscriber may be able to delete, re-share, download to videocast subscriber device 104, un-list videocasts 102 associated with the subscriber to prevent their viewing by other subscribers but maintain their storage by the videocast service 116 (e.g., by the cloud storage module 124), re-list videocasts 102 associated with the subscriber to allow for their viewing by others, or change videocasts 102 availability options to make a videocast 102 private and unavailable for searching or public and available for searching.

Figure 5:
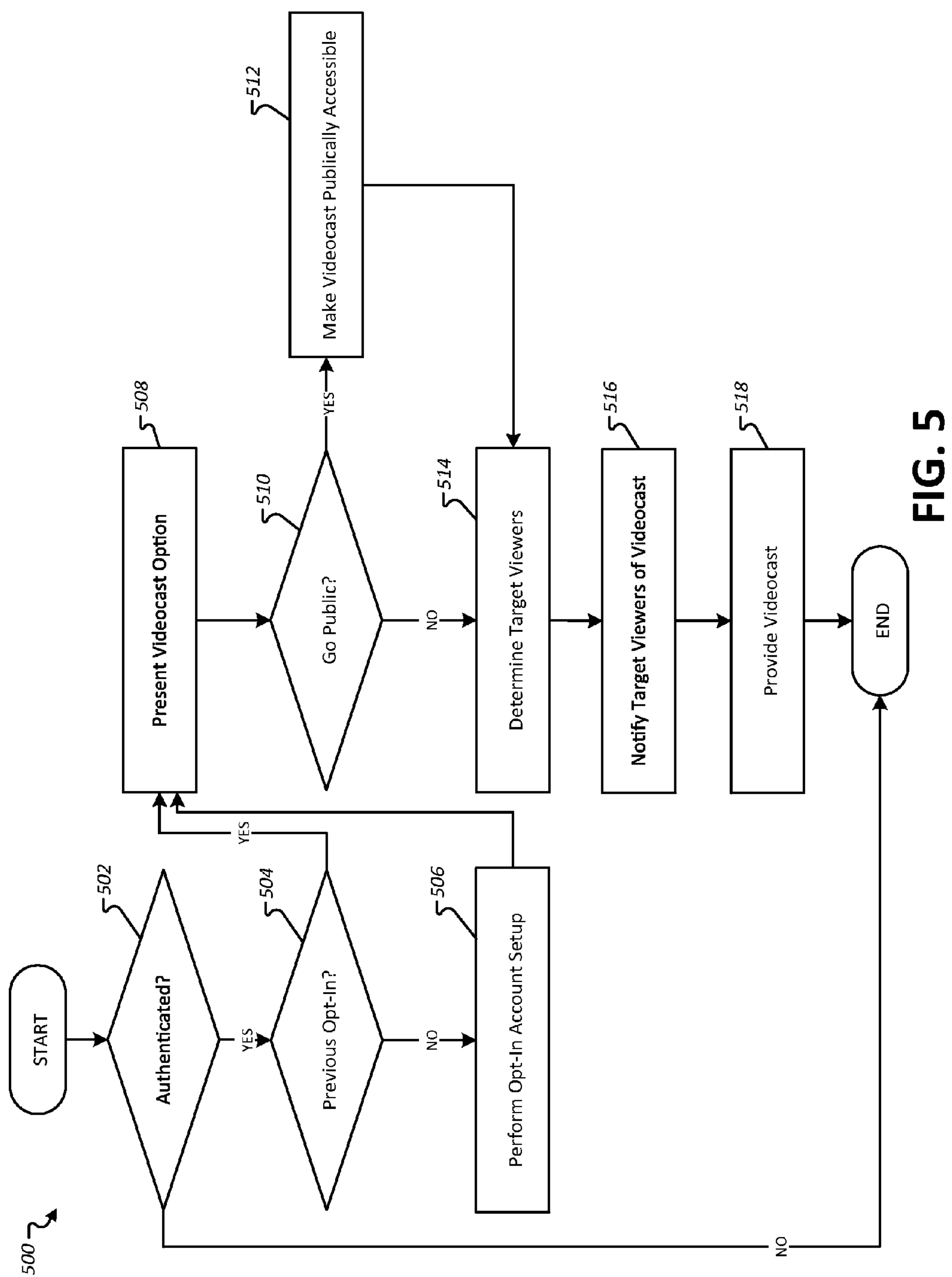
FIG. 5 illustrates an exemplary process for initiating a videocast by a videocast subscriber device.

FIG. 5 illustrates an exemplary process 500 for initiating a videocast 102 by a videocast subscriber device 104 in communication with a videocast service 116 over a communications network 106. In some cases, the process 500 may be performed by a videocast client 112 executed by one or more processors 108 of the videocast subscriber device 104.

In decision point 502, the videocast client 112 determines whether it is authenticated to use the videocast service 116. For example, the videocast client 112 may perform an authentication or validation sequence with the videocast service 116 each time the subscriber broadcasts a videocast 102 or attempts to manage their videocasts 102. If the videocast client 112 validates that the SSO token 140 has not expired, then the videocast client 112 may be able to proceed with the videocast 102 functionality without having to interact with the SPC 138 systems. Otherwise, to perform the validation, the videocast client 112 may be configured to cause the videocast subscriber device 104 to provide a stored SSO token 140 of the videocast subscriber device 104 to the SPC 138 of the network service provider 118. The videocast client 112 may be further configured to receive, from the network service provider 118, a feature code status to the videocast service 116 indicative of whether the videocast service 116 is available for the videocast subscriber device 104. If the videocast service 116 is available for the videocast client 112, control passes to decision point 504. Otherwise, the process 500 ends.

In decision point 504, the videocast client 112 determines whether a previous opt-in was received for the videocast subscriber device 104. For example, the videocast client 112 may be further configured to determine based on the feature code status whether the subscriber has opt-ed in. If so, control passes to block 508. If the videocast service 116 is available but the subscriber has not opt-ed in, control passes to block 506.

In block 506, the videocast client 112 performs an opt-in account setup for the videocast subscriber device 104. For example, the videocast client 112 may display an opt-in prompt in the user interface 114 of the videocast subscriber device 104 including options to opt-in or not to opt-in to use of the videocast service 116. The user interface 114 may further include terms of use of the videocast service 116 to be assented to before allowing the videocast client 112 access. In some examples, the videocast client 112 may also display an option that when selection allows the subscriber to correlate an existing videocast service 116 account that the subscriber may have with the subscriber's network service provider 118 device or account information. If the subscriber refuses to opt-in, then the process 500 ends. Otherwise, the videocast client 112 communicates assent to the opt-in to the videocast service 116, which may provision the videocast service using the SPG 136, and control passes to block 506.

In block 508, the videocast client 112 presents an option to initiate a videocast 102. For example, the videocast client 112 may present a user interface 114 including a videocast capture control 306 that when selected by the user is configured to cause the videocast client 112 to request initiation of a videocast 102 from the videocast subscriber device 104.

In decision point 510, the videocast client 112 identifies whether the initiated videocast 102 is public or personal. For example, the videocast client 112 may present in the user interface 114 a "Go Public" control that may be used by the subscriber to select whether the videocast 102 to be initiated should be publically accessible or searchable. If the videocast is designated as going public, control passes to block 512. Otherwise, control passes to block 514.

In block 512, the videocast client 112 informs the videocast service 116 that the videocast 102 is public. Based on the indication of the videocast 102 going public, the videocast service 116 may access the subscriber database 132 to determine which videocast subscriber devices 104 are following the subscriber creating the videocast 102 and may send notifications 130 to the indicated videocast subscriber devices 104 and/or videocast viewer devices 104-C. As another example, the videocast service 116 may provide notifications 130 to recipients that have recently viewed one or more of the subscriber's public videocasts 102. Additionally or alternately, the videocast 102 may be made searchable in the videocast content portal 400, such as searchable by way of the user interface 114.

In block 514, the videocast client 112 receives selection of subscribers to be notified of the videocast 102. For example, the videocast client 112 may present options to select individuals from contacts of the subscriber, such as contacts from an address book of the subscriber or contacts associated with the subscriber on a social network to which the subscriber is a member.

In block 516, the videocast service 116 notifies the selected subscribers of the videocast 102. For example, the videocast service 116 or the videocast client 112 may provide SMS or email notifications 130 inviting the selected subscribers to join the personal videocast. The videocast service 116 may further receive indications from invited subscribers that have accepted the notifications 130. In some cases, the videocast service 116 may provide the videocast client 112 with notifications 130 of how many subscribers have joined the videocast 102. In other cases, the notifications 130 may include additional information, such as identifiers of which users have joined the videocast 102.

In block 518, the videocast client 112 provides the videocast 102 to the videocast service 116. The videocast service 116 may accordingly provide the videocast 102 to the target videocast subscriber device 104 that are currently authorized and have chosen to receive the videocast 102. After block 516, the process 500 ends.

Variations on the process 500 are possible. For instance, the opt-in decision point 502 may be delayed in performance until after a subscriber selection to create a videocast 102 in block 506. As another example, a videocast 102 may be provided without requiring any notifications 130 to subscribers, where instead the new videocast 102 simply appears in the content portal 400 for viewing.

As yet a further example, the opt-in procedure may allow the subscriber to choose from different levels or classes of videocast service (e.g., free package, silver package, gold package, etc.) with different costs associated with each class. For instance, an advertisement-supported videocast client 112 may be made available in a free package, but an advertisement-free videocast client 112 may be made available in a silver or gold package for a monthly fee. A higher level package such as a gold package may further include additional videocast 102 storage as another possibility.

Thus, by way of the videocast client 112 and videocast service 116, subscribers may use their subscriber devices 104 to create and notify other viewers of their videocasts 102. Moreover, the same videocast client 112 may be utilized by the subscriber to either create a public videocast 102 or a personal videocast 102 targeted toward a particular listing of subscribers. Yet further, by talking advantage of an authentication scheme used by the network service provider 118, access to the videocast service 116 may be provided to subscriber device 104 automatically without further user interface actions once the videocast subscriber device 104 has opted in to use of the videocast service 116.

In general, computing systems and/or devices, such as the videocast subscriber devices 104, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the videocast subscriber devices 104 generally include computer-executable instructions such as the instructions of the videocast client 112, where the instructions may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein, such as the subscriber database 132 or storage of the cloud storage module 124, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. The videocast client 112 may be one such computer program product. In some example, the videocast client 112 may be provided as software that when executed by the processor provides the operations described herein. Alternatively, the videocast client 112 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as “a,” “the,” “said,” etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A videocast service including at least one computing device configured to provide operations comprising:

receiving an indication, from a videocast subscriber device connected to a communications network of network service provider, to begin providing a live videocast broadcast from the videocast subscriber device according to selection of a videocast control from a user interface of the videocast subscriber device;

validating the subscriber device as having opted into use of the videocast service by way of the network service provider; and if the subscriber device is opted in, initiating the videocast without requiring further user interface interaction from the videocast subscriber device.

2. The videocast service of claim 1, further configured to provide operations comprising:

providing notifications of the videocast to target videocast viewer devices; and providing videocast data received from the subscriber device to target videocast viewer devices that have joined the videocast responsive to the notifications.

3. The videocast service of claim 2, wherein the notifications include at least one of: (i) a uniform resource locator referencing a network location of the videocast service at which the videocast is made available, (ii) an indication of a subscriber for whom new content may be available, and (iii) an indication of an identifier of the videocast.

4. The videocast service of claim 2, further configured to perform operations comprising at least one of:

determining target videocast viewer devices according to subscribers that have previously accessed public videocasts of the videocast subscriber device; and determining viewers according to receiving a selection of target videocast viewer devices.

5. The videocast service of claim 1, further configured to perform operations comprising:

acquiring a single sign on token from the videocast subscriber device;

providing the single sign on token to the network service provider; and receiving a feature code status from the network service provider responsive to the providing of the single sign on token, the feature status code indicative of whether the subscriber device is configured to utilize the videocast service and is opted into use of videocast services.

6. The videocast service of claim 1, further configured to perform operations comprising:

receiving an incoming request from another videocast viewer device to join the videocast;

notifying the videocast subscriber device of the other videocast viewer device requesting to join the videocast; and providing videocast data received from the videocast subscriber device to the other videocast viewer device upon joining the other videocast viewer device to the videocast.

7. The videocast service of claim 1, further configured to perform operations comprising:

if the videocast subscriber device is not opted in, requesting an opt-in from the videocast subscriber device; and receiving confirmation of the opt-in request before allowing the videocast subscriber device to begin the videocast.

8. The videocast service of claim 2, wherein the notifications are in the form of at least one of SMS and email.

9. The videocast service of claim 2, wherein the notifications include an invitation to the target videocast viewer devices to join the videocast.

10. A method, comprising:

receiving an indication, from a videocast subscriber device connected to a communications network of network service provider, to begin providing a live videocast broadcast from the videocast subscriber device according to selection of a videocast control from a user interface of the videocast subscriber device;

validating the subscriber device as having opted into use of the videocast service by way of the network service provider; and if the subscriber device is opted in, initiating the videocast without requiring further user interface interaction from the videocast subscriber device.

11. The method of claim 10, further configured to provide operations comprising:

providing notifications of the videocast to videocast viewer devices; and providing videocast data received from the subscriber device to target videocast viewer devices that have joined the videocast responsive to the notifications.

12. The method of claim 11, wherein the notifications include at least one of: (i) a uniform resource locator referencing a network location of the videocast service at which the videocast is made available, (ii) an indication of a subscriber for whom new content may be available, and (iii) an indication of an identifier of the videocast.

13. The method of claim 11, further comprising at least one of:

determining target videocast viewer devices according to subscribers that have previously accessed public videocasts of the videocast subscriber device; and determining viewers according to receiving a selection of target videocast viewer devices.

14. The method of claim 10, further configured to perform operations comprising:

acquiring a single sign on token from the videocast subscriber device;

providing the single sign on token to the network service provider; and receiving a feature code status from the network service provider responsive to the providing of the single sign on token, the feature status code indicative of whether the subscriber device is configured to utilize the videocast service and is opted into use of videocast services.

15. The method of claim 10, further configured to perform operations comprising:

receiving an incoming request from another videocast subscriber device to join the videocast;

notifying the videocast subscriber device of the other videocast subscriber device requesting to join the videocast; and providing videocast data received from the subscriber device to the other videocast subscriber device upon joining the other videocast subscriber device to the videocast.

16. The method of claim 10, further configured to perform operations comprising:

if the videocast subscriber device is not opted in, requesting an opt-in from the videocast subscriber device; and receiving confirmation of the opt-in request before allowing the videocast subscriber device to begin the videocast.

17. A non-transitory computer readable medium storing a videocast client application software program, the videocast client application being executable by a videocast subscriber device to provide operations comprising:

receiving an indication to begin providing a live videocast broadcast from the videocast subscriber device according to selection of a videocast control from a user interface of the videocast subscriber device;

providing a single sign on token from the videocast subscriber device to the videocast service to validate the videocast subscriber device with the videocast service; and initiating the videocast without requiring further user interface interaction from the videocast subscriber device.

18. The computer readable medium of claim 17, further providing for operations comprising providing a confirmation of an opt-in request to allow the videocast subscriber device to utilize the videocast service.

19. The computer readable medium of claim 17, further providing for operations comprising determining target videocast viewer devices according to subscribers that have previously accessed public videocasts of the videocast viewer device; and determining viewers according to receiving a selection of target videocast viewer devices.

20. The computer readable medium of claim 17, further providing for operations comprising receiving a notification indicative of a target videocast viewer device joining the videocast.

* * * * *